Dec. 21, 1954    R. BLOKSMA    2,697,523
FILTER WITH VALVED SEDIMENT TRAP
Filed Aug. 28, 1952
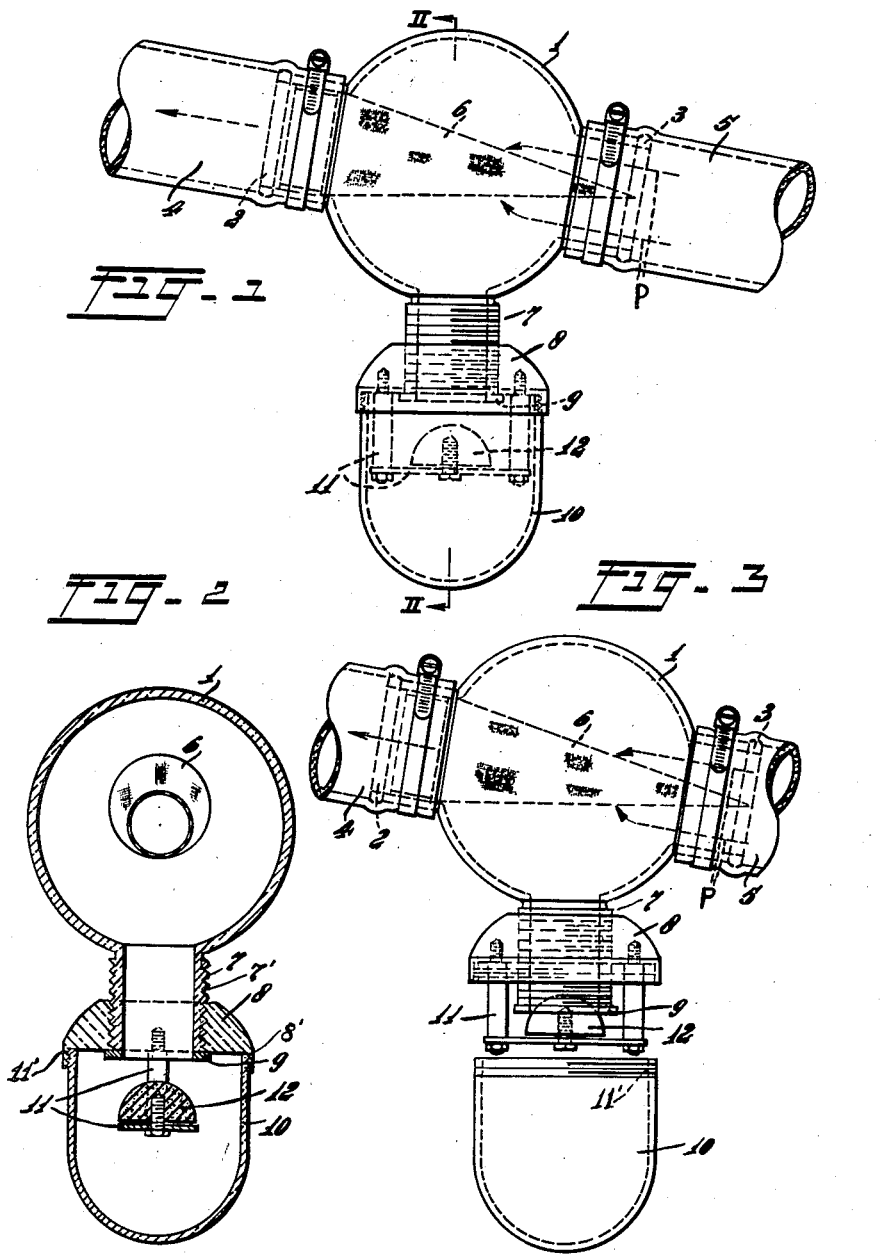
INVENTOR.
Romke Bloksma
BY
ATTORNEY

United States Patent Office 2,697,523
Patented Dec. 21, 1954

2,697,523
FILTER WITH VALVED SEDIMENT TRAP

Romke Bloksma, Amsterdam, Netherlands

Application August 28, 1952, Serial No. 306,833

Claims priority, application Netherlands December 8, 1951

2 Claims. (Cl. 210—165)

This invention relates to apparatus for connection between the ends of a pair of pipes or conduits to permit the collection and removal of impurities contained in fluid conducted through the pipes, and in which the removal of the impurities is possible without disturbing the connected pipes.

It is an object of the invention to provide improved apparatus of the above described kind in which a hollow body part, connected between the ends of a pair of pipes, and containing filter means extending between the pipe ends, carries a reservoir into which impurities collected on said filter means can be deposited and removed without disturbing the connected pipes.

The above and further objects and advantages of the invention, residing in the construction, arrangement and combination of parts, will appear clear from consideration of the following detail description with reference to the accompanying drawings and from the appended claims.

In the drawings:

Fig. 1 is a side view of the device in the operative condition;

Fig. 2 is a section taken upon the line II—II in figure 1; and

Fig. 3 is a side view of the device showing the reservoir removed and the discharge tube closed.

According to the drawing the separating device comprises a housing 1 provided with two pipe connections 2 and 3, by means of which the housing can be fitted between the ends of a pair of conduits 4 and 5. Between the connections 2 and 3 a filtering element 6 is interposed, on which filtering element the impurities from the fluid circulating in the direction of the arrows P will be deposited.

The housing 1 further comprises a discharge tube 7 which is externally screw-threaded, as indicated at 7; and which extends through the central bore of a disc 8. An outwardly directed flange 9 at the free end of the discharge tube prevents the disc 8 from being entirely screwed off the tube 7. The disc 8 has a depending rim flange 8' which is internally screw-threaded for connection with external screw-threading 11' on the upper end of a reservoir cup 10. The screw threading 7' and 8' are of opposite direction, one being right hand and the other being left hand.

At its side facing the reservoir the disc 8 carries a member 12 by means of a supporting construction 11, said member being adapted to close the end of the discharge tube 7 which opens into the reservoir 10.

When using the device, in the operative condition according to figure 1, the impurities deposited on the outside of the filtering element 6 will eventually drop from said element and fall into the reservoir 10 via the discharge tube 7. If after some time the amount of impurities in the reservoir is so large that this reservoir must be emptied, the reservoir is manually turned in the direction in which the disc 8 is screwed farther onto the discharge tube 7 towards the housing 1. This movement of the disc 8 is eventually arrested because the closure member 12 comes against the end of the discharge tube 7 and closes said end.

If now the reservoir 10 is turned further in the same direction the reservoir, on account of the opposite direction of the screw-threading 11; will be screwed off the disc 8 and enable the reservoir to be emptied.

If the emptied reservoir is again screwed onto the disc 8, said disc will remain in place, as seen in Fig. 3, until the connection between the disc and the reservoir has been completed. Then, further turning of the reservoir in the same direction will cause the disc 8 to be screwed downwards along the discharge tube 7, and move the closure member 12 to the open position as seen in Fig. 2, the downward movement being limited by the flange 9.

In order to facilitate inspection, the reservoir 10 and even the whole device can be made of transparent synthetic material.

I claim:

1. In apparatus for connection between the ends of a pair of pipe sections for the collection and removal of impurities in fluid conducted through the pipe sections, said pipe ends having filter means connected therebetween for the adherence of impurities to the filter means, a hollow body part having pipe connections by which said pipe ends can be connected to said body part with said filter means enclosed in said body part and so that fluid communication between said pipe sections takes place via said body part, said body part having a downwardly directed discharge tube in open communication with said body part, said discharge tube having screw-threading thereon, a disc element on said discharge tube and having screw-threaded engagement with said screw-threading to permit said disc element to be screwed up and down relatively to said discharge tube, stop means cooperable between said tube and disc to limit downward movement of said disc and prevent disconnection of the disc from the tube, a closure member for the bottom end of said tube, means supporting said closure member on said disc so that said closure member is moved into closing engagement with said tube end when said disc is screwed upwardly with respect to said tube and is moved away from said tube end to open said tube end when the disc is screwed downwardly with respect to the tube, said disc having a screw-threaded portion of opposite direction to said first mentioned screw-threading, and a reservoir cup for receiving impurities discharged from said filter means, said reservoir cup having screw-threading engageable with said screw-threaded disc portion of opposite direction for alternatively affixing the reservoir cup to the disc, with attendant opening of said closure member with respect to said tube end, or for removing the reservoir from the disc with attendant closing of said closure member against said tube end.

2. In apparatus for connection between the ends of a pair of pipe sections for the collection and removal of impurities in fluid conducted through the pipe sections, said pipe ends having filter means connected therebetween for the adherence of impurities to the filter means, a hollow body part having pipe connections by which said pipe ends can be connected to said body part with said filter means enclosed in said body part and so that fluid communication between said pipe sections takes place via said body part, said body part having a downwardly directed discharge tube in open communication with said body part, said discharge tube having exterior screw-threading of one direction and terminating at its lower end with an outwardly directed radial flange, a disc element having a central opening with internal screw-threading engageable with said tube threading to permit the disc element to be screwed up and down relatively to said tube, said disc element having a depending flange on its outer periphery, said flange having interior screw-threading of opposite direction to said tube threading, a closure member, means supporting said closure member upon said disc element for up and down movement with said disc element, said closure member being engageable against the lower end of said discharge tube to close said tube end when the said disc is screwed upwards relatively to said tube, and a cup reservoir having an open upper end with exterior screw-threading engageable with the screw-threading on said disc flange, said cup reservoir being removable from said disc when the said closure member is closed against said tube end.

(References on following page)

References Cited in the file of this patent

UNITED STATES PATENTS

| Number | Name | Date |
|---|---|---|
| 1,244,833 | Burich | Oct. 30, 1917 |
| 1,365,644 | Applin | Jan. 18, 1921 |
| 1,446,056 | Misener | Feb. 20, 1923 |
| 1,458,464 | Byers | June 12, 1923 |
| 1,857,606 | Rendelman | May 10, 1932 |
| 2,524,336 | Vokes | Oct. 3, 1950 |
| 2,606,663 | Blackman et al. | Aug. 12, 1952 |

FOREIGN PATENTS

| Number | Country | Date |
|---|---|---|
| 272,266 | Great Britain | June 2, 1927 |